US007036838B2

(12) United States Patent
Leffler

(10) Patent No.: US 7,036,838 B2
(45) Date of Patent: May 2, 2006

(54) WHEELCHAIR AND LEG SUPPORT ACCESSORY

(76) Inventor: Jeffrey Alan Leffler, 3605 Dorchester, Michigan City, IN (US) 46360

( * ) Notice: Subject to any disclaimer, the term of this patent is extended or adjusted under 35 U.S.C. 154(b) by 120 days.

(21) Appl. No.: 10/777,340

(22) Filed: Feb. 12, 2004

(65) Prior Publication Data

US 2005/0179230 A1 Aug. 18, 2005

(51) Int. Cl.
*A61G 5/10* (2006.01)
*B62M 1/14* (2006.01)

(52) U.S. Cl. ................................ 280/304.1; 280/250.1

(58) Field of Classification Search ............ 280/304.1, 280/250.1, 242.1, 288.4, 291; 297/DIG. 4, 297/423.18, 423.4, 423.1

See application file for complete search history.

(56) References Cited

U.S. PATENT DOCUMENTS 4,227,742 A 10/1980 Thomas
4,324,414 A * 4/1982 Wilkes .................... 280/250.1
4,486,048 A 12/1984 Meyer
4,592,562 A * 6/1986 Strautnieks et al. ..... 280/250.1
4,593,929 A * 6/1986 Williams .................... 280/650
5,033,793 A 7/1991 Quintile
D340,594 S 10/1993 Lambert
D347,533 S 6/1994 Lambert
5,328,247 A 7/1994 Lovins
5,333,887 A * 8/1994 Luther ..................... 280/250.1
5,673,967 A 10/1997 Wempe
5,860,664 A * 1/1999 Smith ...................... 280/250.1
5,906,415 A 5/1999 Mocur
D415,076 S 10/1999 Garven, Jr.
6,152,478 A 11/2000 Hung
6,276,704 B1 8/2001 Suiter
6,322,250 B1 * 11/2001 Pratt .......................... 378/208
6,428,103 B1 8/2002 Hong
6,494,475 B1 12/2002 Rossi et al.
6,543,854 B1 4/2003 Finch
6,648,354 B1 11/2003 James

* cited by examiner

*Primary Examiner*—Tony Winner
(74) *Attorney, Agent, or Firm*—Wood, Phillips, Katz, Clark & Mortimer

(57) ABSTRACT

A leg support accessory for a wheelchair including a leg rest wider than the wheelchair seat, a vertical support secured at an upper end to the leg rest and including in its lower end a downwardly open recess adapted to receive the foot rest supports, and first and second braces each fixed on one end to the vertical support and at the other end having an opening adapted to fixedly receive one of the arm support posts. When the accessory is used with the wheelchair, the braces receive arm support posts on opposite sides of the seat, and the foot rest supports in their raised position are received in the vertical support recess with the leg rest supported in a substantially horizontal orientation with lateral ends extending beyond the sides of the seat.

20 Claims, 5 Drawing Sheets

WHEELCHAIR AND LEG SUPPORT ACCESSORY

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward wheel chairs, and particularly toward a wheel chair accessory for supporting a user's legs.

BACKGROUND OF THE INVENTION AND TECHNICAL PROBLEMS POSED BY THE PRIOR ART

Wheelchairs are, of course, widely used to provide a mode of transportation for persons whose ability to walk is limited. Such wheelchairs must, of course, be sturdy and reliable and therefore can be fairly costly.

Different limitations may, however, require different configurations for different users. Further, wheelchairs are often used by many different people over the useful life of the wheelchair (e.g., where a person is only temporarily handicapped, by a broken leg, for example, they will rent a chair until the leg is healed and then return it to be used by someone else who may have a different condition). Therefore, it is economically desirable to construct wheelchairs which can be used by the most people given the unreasonable cost of manufacturing each wheelchair for a particular individual's requirements, particularly since those requirements may exist for only a limited time period. A medical supply company will not want to stock an expensive wheelchair which, due to a special configuration useful to only a few people, will often sit unused (and unrented) in their stock of equipment.

As a result of the above, most wheelchairs have a standard configuration providing a seat with an upright back and foot rests supported at the front of the seat, where the foot rests may be adjusted to allow a user to sit in a substantially normal seated position with their feet on the foot rests, and the foot rests may also be pivoted up to alternatively allow the user's feet to be elevated straight out in front of them up to about the height of the seat. Side arms are also typically provided on opposite sides of the seat of standard wheelchairs, for stability in holding the user in the chair and also to protect the user from getting caught up in the wheels.

Unfortunately, there are people who have wheelchair requirements which are not met by such standard wheelchairs. Persons having those requirements may often be faced with the untenable choice of having no chair and therefore being unable to move around, or of attempting to squeeze or twist their body in order to use an inadequate standard configuration chair, or of finding a wheelchair specially made for their condition. Such specially made wheelchairs can be very expensive, unreasonably so where the user needs it only for a short period of time due to a temporary condition.

The present invention is directed toward overcoming one or more of the problems set forth above.

SUMMARY OF THE INVENTION

In one aspect of the present invention, a leg support accessory is provided for a wheelchair having a seat supported by a wheel carriage, a back at the rear of the seat, arm support posts on opposite sides of the seat, and foot rest supports pivotable between raised and lowered positions in front of the seat. The accessory includes a leg rest wider than the wheelchair seat, a vertical support secured at an upper end to the leg rest and including in its lower end a downwardly open recess adapted to receive the foot rest supports, and first and second braces each fixed on one end to the vertical support and at the other end having an opening adapted to fixedly receive one of the arm support posts. When the accessory is used with the wheelchair, the first and second braces receive arm support posts on opposite sides of the seat, and the foot rest supports in their raised position are received in the vertical support recess with the leg rest supported in a substantially horizontal orientation with lateral ends extending beyond the sides of the seat.

In one form of this aspect of the present invention, the leg rest provides a support surface for a user's legs which is at least substantially as high as the seat.

In another form of this aspect of the present invention, the leg rest is supported at an elevated position relative to the seat when used.

In yet another form of this aspect of the present invention, the leg rest includes opposite ends extending laterally beyond the sides of the seat when used with the wheelchair, with the opposite ends each having a lateral width sufficient to support a user's leg thereon.

In a still further form of this aspect of the present invention, the first and second braces are fixed on the one end at substantially right angles to the vertical support. In a further form of this aspect of the present invention, the opening at the other end of each of the first and second braces is adapted to fixedly receive one of the arm support posts with the brace extending substantially horizontally away from the back of the wheelchair.

In another aspect of the present invention, an adaptable wheelchair is provided, including a seat supported by a wheel carriage, a back at the rear of the seat, a foot rest support selectively movable between raised and lowered positions in front of the seat, arms on opposite sides of the seat, the arms being removably secured to upright arm support posts at opposite sides of the front of the seat, and a selectively usable leg support accessory. The accessory includes a leg rest wider than the wheelchair seat, a vertical support secured at an upper end to the leg rest and including in its lower end a downwardly open recess adapted to receive the foot rest support, and first and second braces each fixed on one end to the vertical support and at the other end having an opening adapted to fixedly receive one of the arm support posts. When the leg support accessory is used to selectively support a rider having wide leg casts, the arm support posts on opposite sides of the seat are received in the openings of the first and second braces, and the foot rest supports in their raised position are received in the vertical support recess, whereby the leg rest is supported in a substantially horizontal orientation with lateral ends extending beyond the sides of the seat.

In one form of this aspect of the present invention, a support cushion is provided on the seat. In a further form, the support cushion and the leg rest provide support surfaces for a user's legs and posterior higher than the seat. In a still further form, the support cushion and the leg rest provide support surfaces for a user's legs and posterior at substantially the same height above the seat.

In another form of this aspect of the present invention, the leg rest is supported at an elevated position relative to the seat.

In still another form of this aspect of the present invention, locks selectively secure the upright arm support posts to the arms.

In yet another form of this aspect of the present invention, a cushion is provided on the leg rest.

In another form of this aspect of the present invention, the foot rest support comprises two support legs at opposite sides of the front of the seat, and the vertical support comprises two support posts aligned with the two support legs, whereby one support leg is received in a recess of one support post and the other support leg is received in a recess of the other support post.

In a further form of this aspect of the present invention, the arms are on laterally opposite sides of the seat, and the leg rest includes opposite ends extending laterally beyond the sides.

In a still further form of this aspect of the present invention, the foot rest support includes first and second leg members secured at opposite front corners of the seat for selected pivotal movement, wherein the leg members extend substantially forward from the seat when in the raised position, and the leg rest includes opposite ends extending laterally beyond the leg members.

In still another aspect of the present invention, a leg support accessory is provided for a wheelchair having a seat supported by a wheel carriage, a back at the rear of the seat, and frame members on opposite sides of the seat. The leg support accessory includes a leg rest extending laterally wider than at least one side of the wheelchair seat, and brace members releasably securable to the wheelchair frame member on at least the one side of the seat. When the accessory is used with the wheelchair, the brace members are releasably secured to the frame member on at least the one side of the seat to support the leg rest in a substantially horizontal orientation with at least one lateral end extending beyond the one side of the wheelchair seat.

In one form of this aspect of the invention, releasable straps are adapted to releasably secure the brace members to the wheelchair frame member on at least the one side of the seat.

In another form of this aspect of the invention, the brace members include a vertical support supporting the leg rest on the upper end thereof and releasably securable to the wheelchair on the other end thereof, and a first brace fixed on one end at substantially right angles to the vertical support and releasably fixed on the other end to the wheelchair frame member on at least the one side of the seat.

In still another form of this aspect of the invention, the brace members are releasably securable to the wheelchair frame member on both sides of the seat, and the leg rest extends laterally wider than both sides of the wheelchair seat.

DETAILED DESCRIPTION OF THE INVENTION

Figure 1:
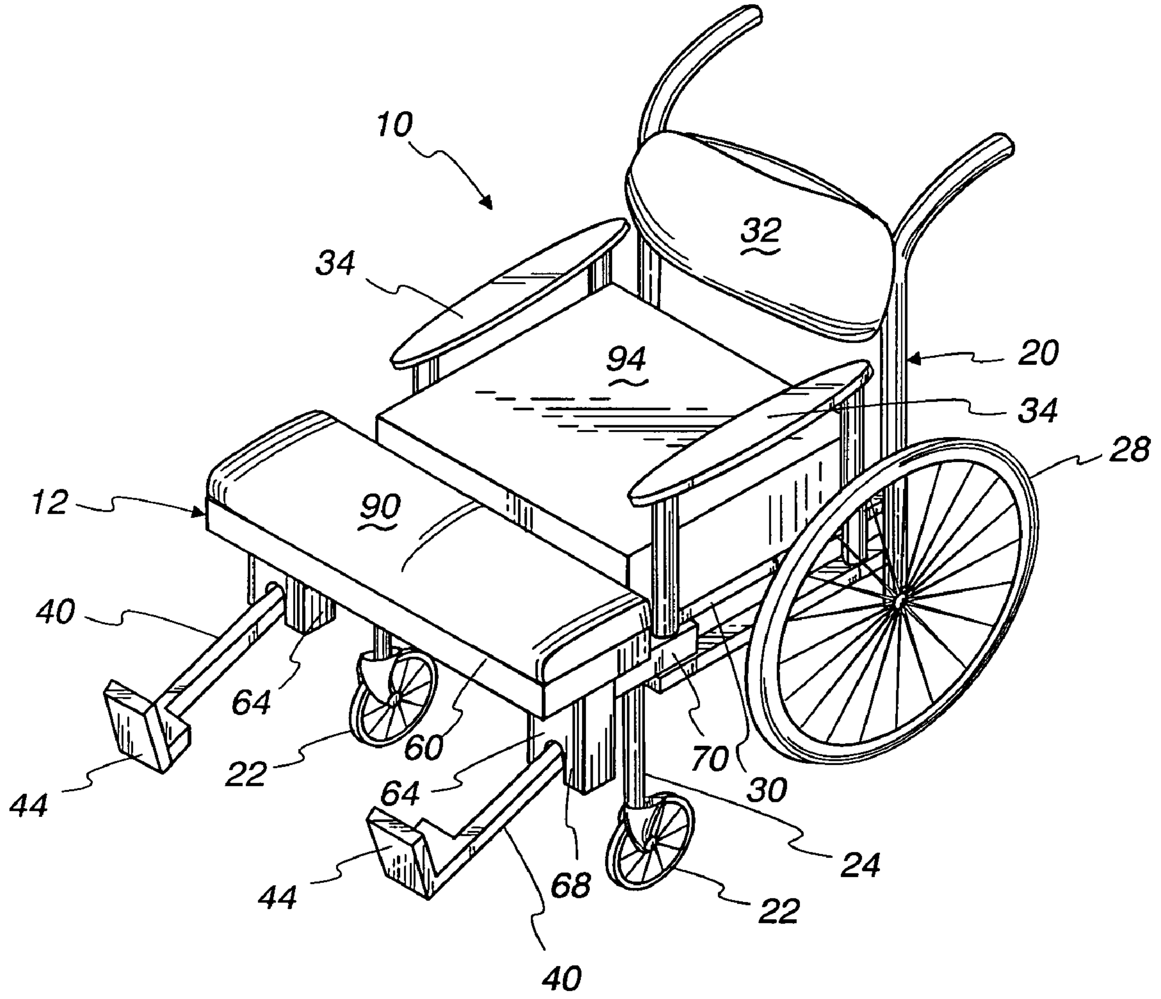
FIG. 1 is a perspective view of a first embodiment of a leg support accessory used with a wheelchair in accordance with the present invention.

FIG. 1 illustrates a wheelchair 10 on which a leg support accessory 12 incorporating the present invention is secured.

The wheelchair 10 may be of a known configuration, with a carriage 20 supported by a pair of front wheels 22 at the bottom of front legs 24 of the carriage 20 and by manually drivable wheels 28 at the rear of the carriage 20. The front wheels 22 may rotate about a horizontal axis which is itself pivotable about a vertical axis to facilitate turning as is known.

Figure 2:
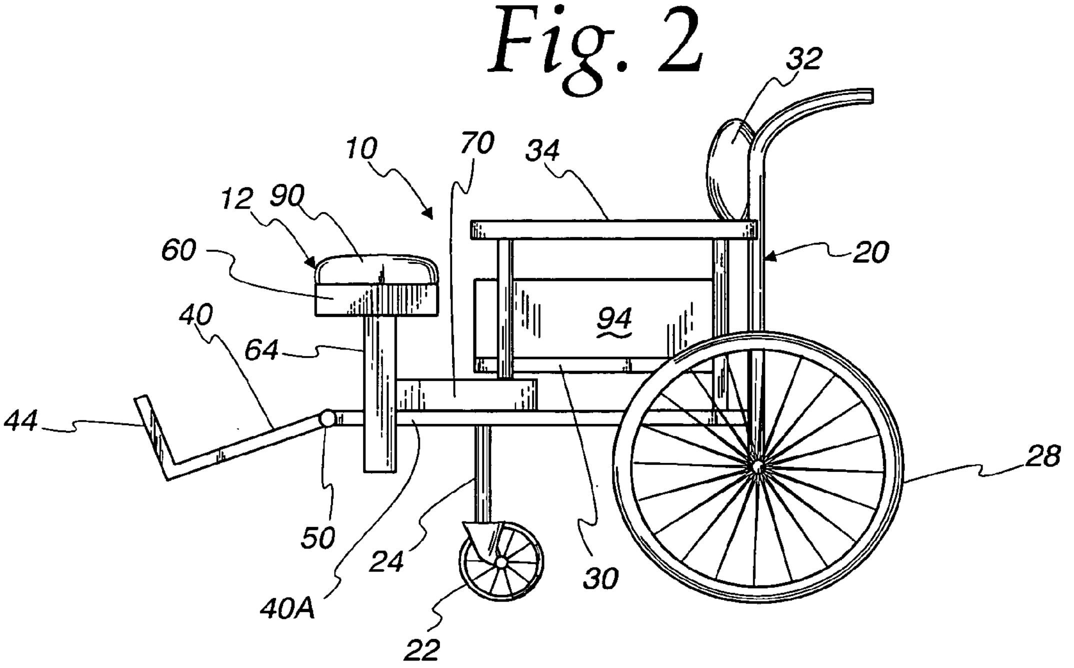
FIG. 2 is a side view of FIG. 1.
Figure 3:
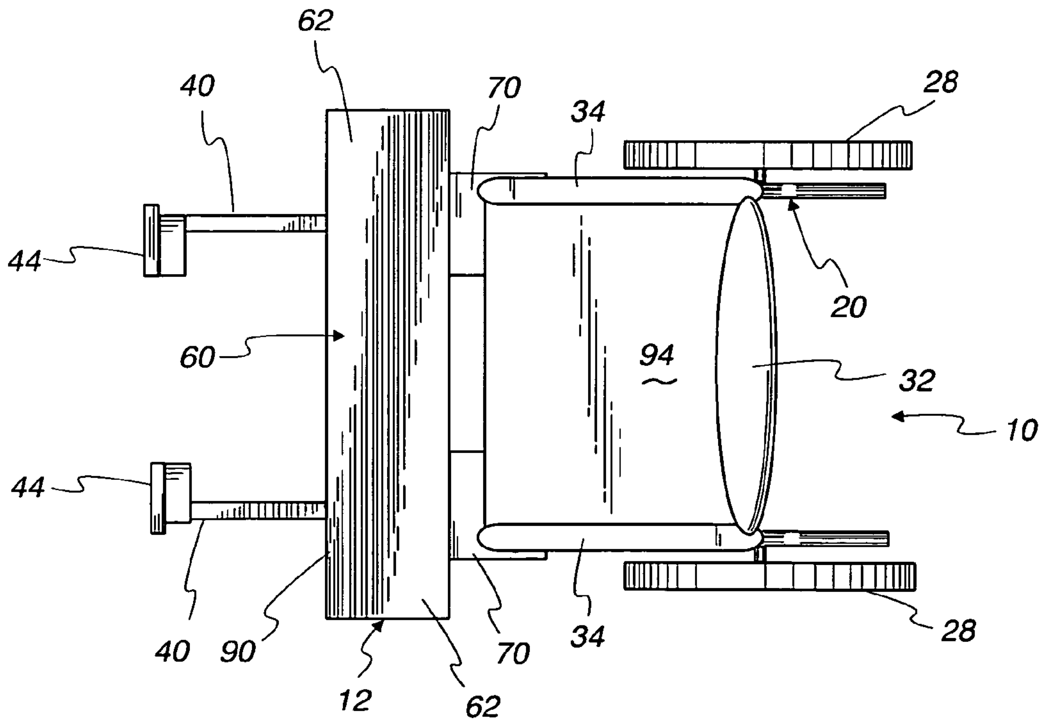
FIG. 3 is a top view of FIG. 1.
Figure 6:
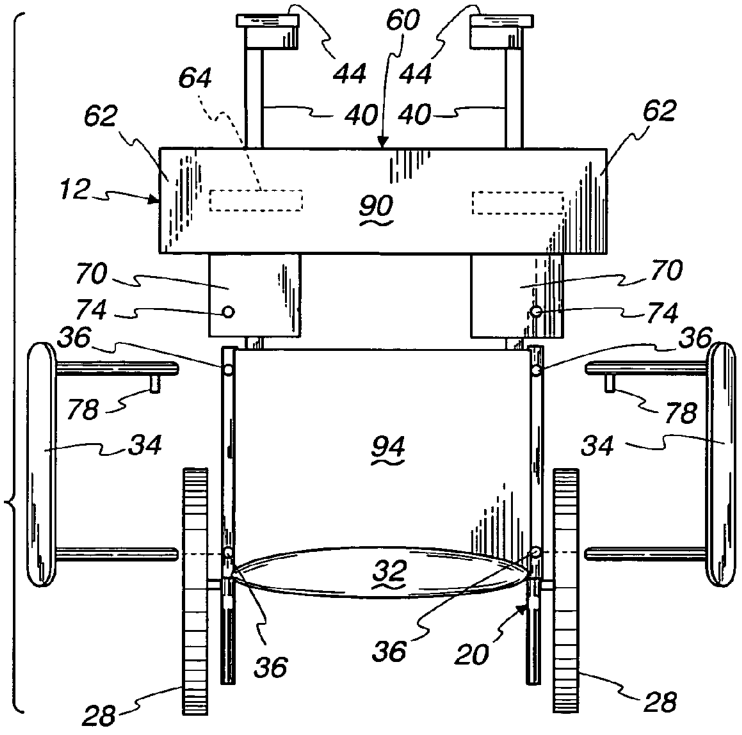
FIG. 6 is an exploded top view showing the wheelchair arms removed for assembly of the FIG. 1 accessory with the wheelchair.

The carriage 20 supports a seat 30 (see particularly FIG. 2) and a back 32 between arm rests 34 on opposite lateral sides of the wheelchair 10. The arm rests 34 are removably secured to support posts 36 (see FIG. 6) on opposite lateral sides of the carriage 20.

At the front of the wheelchair 10, foot rest supports 40 are provided on each side of the carriage 20, each supporting a foot rest 44 at the end thereof. The supports 40 are pivotably secured to the carriage 20 so that they may be moved between raised and lowered positions in front of the seat 30. When a user is able to sit upright in a normal sitting position, the supports 40 may be lowered to a generally vertical position and the user may then rest his or her feet on the foot rests 44 with their knees bent and their lower legs in a generally vertical orientation. When it is desirable to have one or more of the user's legs raised, the foot rest supports 40 may be appropriately placed in a raised position. While such foot rests 44 are suitable for many wheelchair users, there are some users who will be unable to comfortably use the wheelchair 10 as described below.

As illustrated in FIGS. 1–6, the foot rest supports 40 are attached to the wheelchair carriage 20 by suitable locking pivots 50 (see FIG. 2) which allow the supports 40 to be selectively placed in the desired position. As illustrated for exemplary purposes, the foot rest supports 40 may also include a portion 40*a* which is extendable forwardly from the carriage 20, as by a telescoping connection. However, it should be understood that the connection of the foot rest supports 40 to the carriage 20 are not limited to the illustrated structures, and any structure which would enable the support of the accessory 12 such as described below could embody the present invention.

Moreover, it should be understood that the illustrated wheelchair is merely an example of one wheelchair with which the present invention may be incorporated, and the present invention may be used with many different wheelchair configurations other than those shown in the drawings including, for example, configurations in which the wheelchair is driven by an electric motor.

The leg support accessory 12 embodying the present invention includes a leg rest 60 having ends 62 extending laterally wider on both sides of the wheelchair 10 than the normal lateral dimension of the wheelchair seat 30/arm rests 34/foot rests 44. A pair of vertical supports 64 are secured at their upper end to the leg rest 60, and include a downwardly open recess 68 on their lower end (see FIG. 5). The downwardly open recesses 68 are adapted to receive a portion of the foot rest supports 40, 40*a* which is in a raised, generally horizontal, position extending forwardly from the front of the wheelchair carriage 20.

Braces 70 are fixed on one end to the vertical supports 64 in a generally perpendicular orientation such that the braces 70 are generally oriented horizontally when used. The braces 70 also each include an opening 74 generally near their other end. In accordance with the present invention, the accessory 12 may be easily and advantageously assembled with the wheelchair 10 by removing the arm rests 34 and positioning the foot rest supports 40 in a raised position, at which point the accessory 12 may be positioned with the front arm rest support posts 36 received in the openings 74 of the braces 70 and with the foot rest supports 40, 40*a* received in the vertical support recesses 68. It should thus be appreciated that the accessory 12 will be securely mounted on the wheelchair 10 when the arm rests 34 are then secured in position on the support posts 36. Suitable locking structures for securing the arm rests 34 to the support posts 36 may be provided, such as pins 78 (see FIG. 6) which may be extended through aligned holes in the arm rests 34 and support posts 36.

Figure 4:
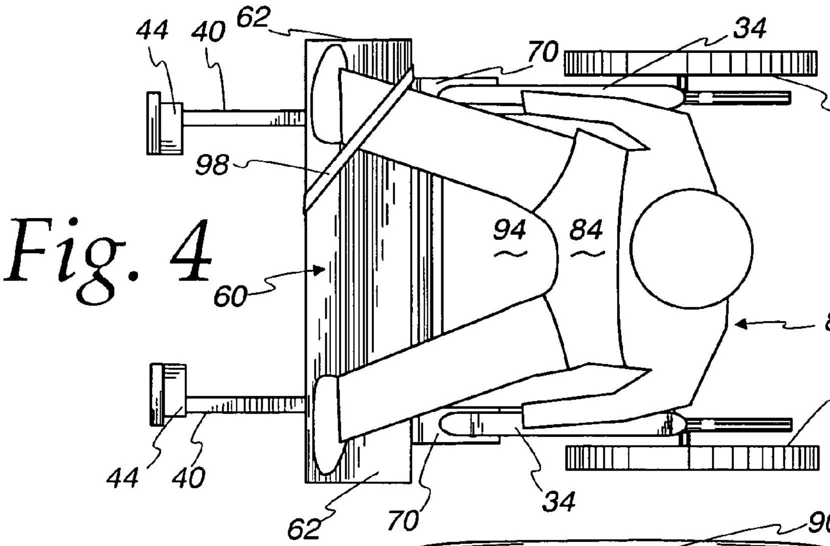
FIG. 4 is a top view similar to FIG. 3, showing a user in the wheelchair.
Figure 5:
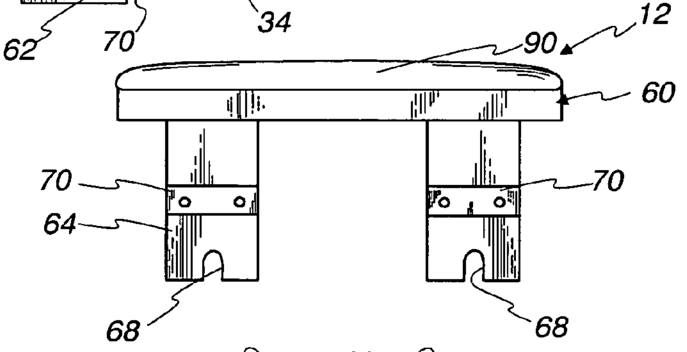
FIG. 5 is a rear view of the FIG. 1 leg support accessory.

As illustrated particularly in FIG. 4, a user 80 whose legs are forced into an outwardly splayed position (e.g., by a hip cast 84) may advantageously use the present invention, even though their feet are much wider than the foot rests 44 of the wheelchair 10 could accommodate.

For added comfort, a cushion 90 may be included as an upper layer of the leg rest 60. Further, a support cushion 94 (such as a seat pad or pillow) may be advantageously provided on the wheelchair seat 30, whereby the leg rest cushion 90 and the seat support cushion 94 may provide support surfaces for the legs and posterior of a user 80 at substantially the same height above the seat 30. The support cushion 94 may be sized particularly to accommodate the raised height of the leg rest 60 as may result from the attachment of the supports 64 and braces 70 to the wheelchair 10, thereby allowing a user 80 to comfortably use the wheelchair 10 without having their legs raised uncomfortably.

It should further be appreciated, as illustrated in FIG. 4, that one or more safety straps 98 may also be provided to safely secure the leg(s) of the user 80 on the leg rest 60.

Figure 7:
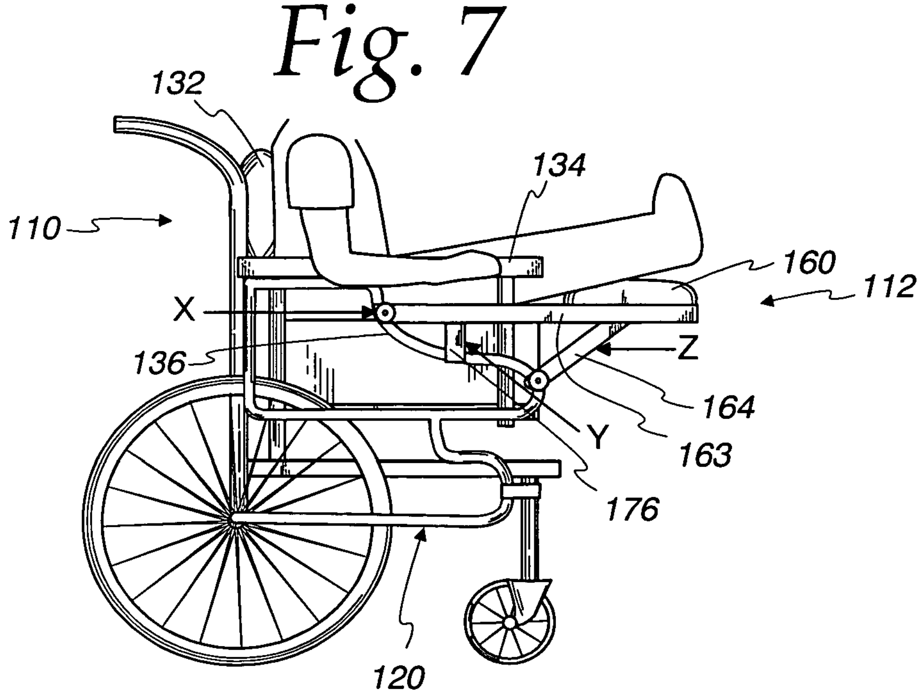
FIG. 7 a side view of a second embodiment of a leg support accessory used with another wheelchair in accordance with the present invention.

FIG. 7 illustrates another wheelchair 110 on which another embodiment of a leg support accessory 112 incorporating the present invention is secured.

The wheelchair carriage 120 supports a seat and a back 132 between arm rests 134 on opposite lateral sides of the wheelchair 110. Frame members 136 are also provided on opposite lateral sides of the carriage 120.

The leg support accessory 112 embodying the present invention includes a leg rest 160 having ends 162 extending laterally wider on at least one side of the wheelchair 110 (and, as illustrated, is laterally wider on both sides of the wheelchair 110) than the normal lateral dimension of the arm rests 134/frame members 136.

Figure 9:
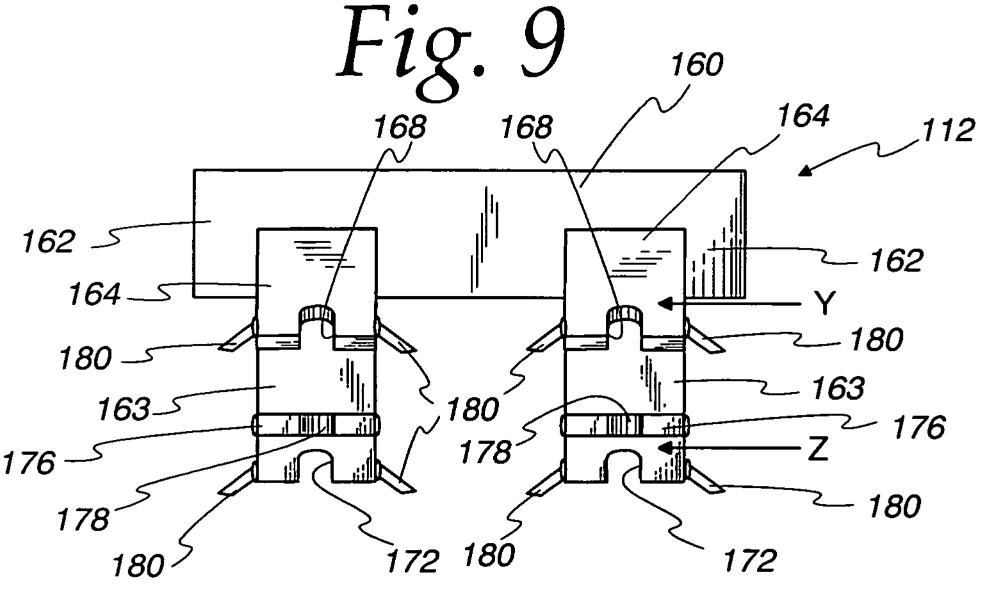
FIG. 9 is a bottom view of the leg support accessory of FIG. 7.

A pair of generally horizontal supports 163 extend rearwardly from the leg rest 160, and angled supports or braces 164 are secured at their upper end to the leg rest 160/horizontal supports 163, and include a downwardly open recess 168 on their lower end (see FIG. 9). The downwardly open recesses 168 are adapted to receive a portion of the frame members 136. The rear end of the horizontal supports 163 also include open recesses 172 adapted to receive another portion of the frame members 136. A horizontal support or brace 176 may also be provided at an intermediate location beneath the horizontal supports 163 with downwardly open recesses 178 also adapted to receive a portion of the frame members 136.

Suitable mechanisms may be provided to secure the supports 163, 164, and/or 176 to the frame members 136. For example, as illustrated in FIG. 9, lock down straps 180 may be releasably secured at opposite ends to selected supports 163, 164 and wrapped around the frame members 136.

Figure 10:
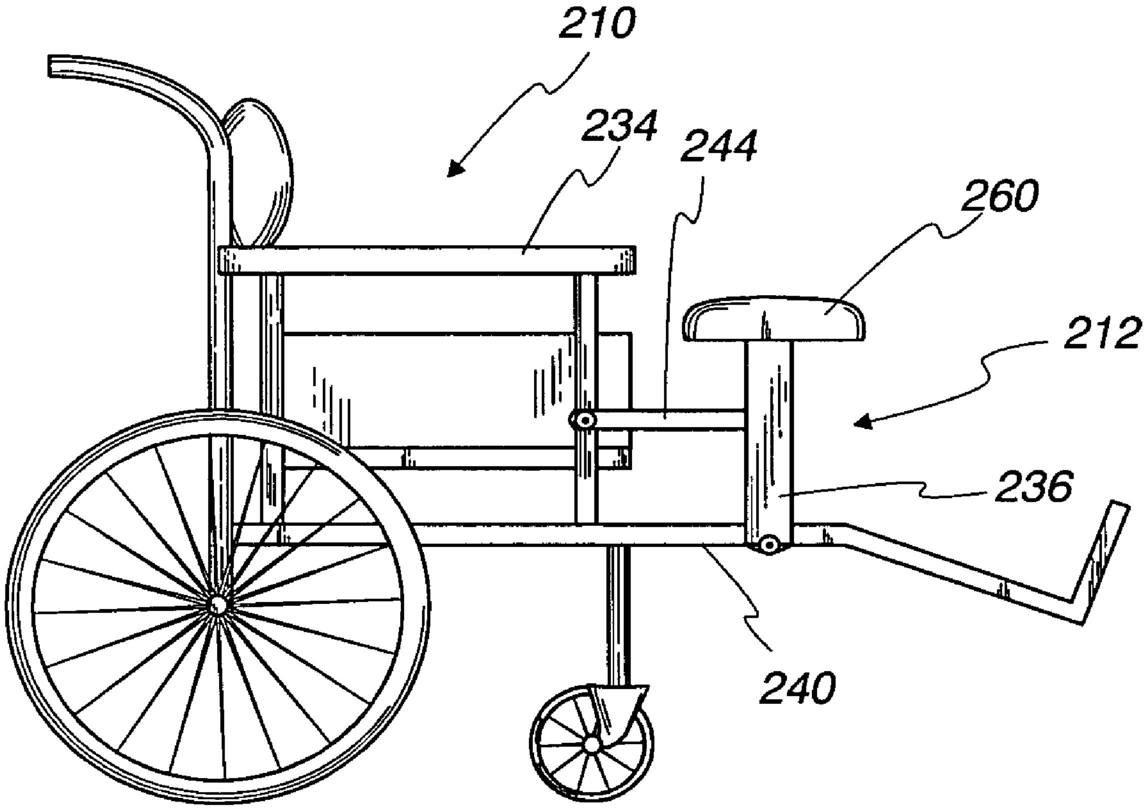
FIG. 10 is a side view of a third embodiment of a leg support accessory used with yet another wheelchair in accordance with the present invention.

FIG. 10 illustrates another wheelchair 210 on which still another embodiment of a leg support accessory 212 incorporating the present invention is secured.

The FIG. 10 wheelchair 210 is similar to the FIG. 1 wheelchair 10, except that the arm rests 234 are not removable. With this embodiment, at least one vertical support 236 is suitably supported on its lower end to the foot rest support 240 (e.g., such as shown with the FIGS. 1–6 embodiment). A horizontal support 244 extends rearwardly from the vertical support 236, and is suitably secured on its rearward end (e.g., with a lock down strap such as shown with the FIGS. 7–9 embodiment) to the arm rest 234.

A leg rest 260 is suitably secured to the upper end of the vertical support 236.

Figure 8:
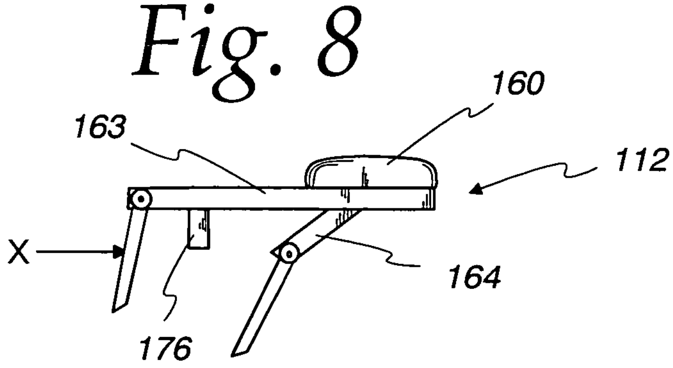
FIG. 8 is a side view of the leg support accessory of FIG. 7.

It should thus be appreciated that the accessory 112 of FIGS. 7–9 may be used with wheelchairs 110 which do not have detachable arms or pivotable foot rest supports. The accessory 212 of FIG. 10 may be used with wheelchairs 210 which do not have detachable arms, but which have pivotable foot rest supports. It should thus also be appreciated that a combination of the features of these embodiments may be used to provide very few different suitable accessory structures for virtually all wheelchairs.

It should still further be appreciated that leg support accessories according to the present invention may be provided on only one side, with a leg rest for only one leg (e.g., allowing the user to bend their other leg in a normal sitting position, when appropriate with their condition).

Thus, it should be appreciated that wheelchairs which are readily usable for common conditions may also be advantageously used by people having such less common needs, particularly users whose legs may be forced apart as by a hip cast. Thus, wheelchair manufacturers, and suppliers of wheelchairs, may provide a basic wheelchair for most users, and also allow the use of such wheelchairs for such special need people at very low cost.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A leg support accessory for a wheelchair having a seat supported by a wheel carriage, a back at the rear of the seat, arm support posts on opposite sides of the seat, and foot rest supports pivotable between raised and lowered positions in front of the seat, said leg support accessory comprising:

a leg rest wider than the wheelchair seat;

a vertical support secured at an upper end to said leg rest and including in its lower end a downwardly open recess adapted to receive said foot rest supports;

first and second braces each fixed on one end to said vertical support and at the other end having an opening adapted to fixedly receive one of said arm support posts;

wherein when the accessory is used with the wheelchair, said first and second braces receive arm support posts on opposite sides of the seat and said foot rest supports in a raised position are received in said vertical support recess with said leg rest supported in a substantially horizontal orientation with lateral ends extending beyond the sides of the seat.

2. The accessory of claim 1, wherein said leg rest provides a support surface for a user's legs which is at least substantially as high as said seat.

3. The accessory of claim 2, wherein when used, said leg rest is supported at an elevated position relative to said seat.

4. The accessory of claim 1, wherein said leg rest includes opposite ends extending laterally beyond the sides of the seat when used with the wheelchair, said opposite ends each having a lateral width sufficient to support a user's leg thereon.

5. The accessory of claim 1, wherein said first and second braces are fixed on said one end at substantially right angles to said vertical support.

6. The accessory of claim 5, wherein said opening at said other end of each of said first and second braces is adapted to fixedly receive said one of said arm support posts with said brace extending substantially horizontally away from the back of the wheelchair.

7. An adaptable wheelchair, comprising a seat supported by a wheel carriage;

a back at the rear of the seat;

a foot rest support selectively movable between raised and lowered positions in front of the seat;

arms on opposite sides of the seat, said arms being removably secured to upright arm support posts at opposite sides of the front of the seat; and a selectively usable leg support accessory including a leg rest wider than the wheelchair seat, a vertical support secured at an upper end to said leg rest and including in its lower end a downwardly open recess adapted to receive said foot rest support, and first and second braces each fixed on one end to said vertical support and at the other end having an opening adapted to fixedly receive one of said arm support posts, wherein when said leg support accessory is used to selectively support a rider having wide leg casts:

said arm support posts on opposite sides of the seat are received in said openings of said first and second braces, and said foot rest supports in a raised position are received in said vertical support recess, whereby said leg rest is supported in a substantially horizontal orientation with lateral ends extending beyond the sides of the seat.

8. The wheelchair of claim 7, further comprising a support cushion on said seat.

9. The wheelchair of claim 8, wherein said support cushion and said leg rest provide support surfaces for a user's legs and posterior higher than said seat.

10. The wheelchair of claim 9, wherein said support cushion and said leg rest provide support surfaces for a user's legs and posterior at substantially the same height above said seat.

11. The wheelchair of claim 7, wherein when used, said leg rest is supported at an elevated position relative to said seat.

12. The wheelchair of claim 7, further comprising locks selectively securing said upright arm support posts to said arms.

13. The wheelchair of claim 7, further comprising a cushion on said leg rest.

14. The wheelchair of claim 7, wherein said foot rest support comprises two support legs at opposite sides of the front of the seat, and said vertical support comprises two support posts aligned with said two support legs, whereby one support leg is received in a recess of one support post and the other support leg is received in a recess of the other support post.

15. The wheelchair of claim 7, wherein said arms are on laterally opposite sides of said seat, and said leg rest includes opposite ends extending laterally beyond said sides.

16. The wheelchair of claim 7, wherein:

said foot rest support includes first and second leg members secured at opposite front corners of said seat for selected pivotal movement, wherein said leg members extend substantially forward from said seat when in said raised position; and said leg rest includes opposite ends extending laterally beyond said leg members.

17. A leg support accessory for a wheelchair having a seat supported by a wheel carriage, a back at the rear of the seat, and frame members on opposite sides of the seat, said leg support accessory comprising:

a leg rest extending laterally wider than at least one side of the wheelchair seat; and brace members releasably securable to the wheelchair frame member on at least said one side of the seat;

wherein when the accessory is used with the wheelchair, said brace members are releasably secured to said frame member on at least said one side of the seat to support said leg rest in a substantially horizontal orientation with at least one lateral end extending beyond the one side of the wheelchair seat.

18. The accessory of claim 17, further comprising releasable straps, said releasable straps adapted to releasably secure said brace members to said wheelchair frame member on at least said one side of the seat.

19. The accessory of claim 17, wherein said brace members comprise:

a vertical support supporting the leg rest on the upper end thereof and releasably securable to the wheelchair on the other end thereof; and a first brace fixed on one end at substantially right angles to said vertical support and releasably fixed on the other end to the wheelchair frame member on at least said one side of the seat.

20. The accessory of claim 17, wherein said brace members are releasably securable to the wheelchair frame member on both sides of the seat, and said leg rest extends laterally wider than both sides of the wheelchair seat.

* * * * *